United States Patent

Shor

[11] Patent Number: 5,269,912
[45] Date of Patent: Dec. 14, 1993

[54] PRECIOUS METAL RECOVERY SYSTEM

[76] Inventor: Peter S. Shor, 230 E. 15th St., New York, N.Y. 10003

[21] Appl. No.: 791,971

[22] Filed: Nov. 13, 1991

[51] Int. Cl.⁵ .................. B01D 35/027; B01D 29/56
[52] U.S. Cl. .................. 210/109; 210/111; 210/121; 210/244; 210/416.1; 210/295; 210/335; 210/339; 210/454; 210/474; 210/475; 210/147
[58] Field of Search .......... 210/335, 416.1, 474, 210/475, 244, 295, 339, 454, 172, 109, 111, 121, 416.3, 147

[56] References Cited

U.S. PATENT DOCUMENTS

| | | | |
|---|---|---|---|
| 1,611,739 | 12/1926 | Hadfield | 210/416.1 |
| 1,785,480 | 12/1930 | Durdin | 210/411 |
| 2,563,862 | 8/1951 | Nechine | 210/416.1 |
| 2,865,511 | 12/1958 | Hopkins | 210/416.1 |
| 3,015,279 | 1/1962 | Nechine | 210/108 |
| 3,447,685 | 6/1969 | Bircher | 210/167 |
| 3,455,457 | 7/1969 | Popelar | 210/168 |
| 3,616,917 | 11/1971 | Hellwege | 210/167 |
| 4,066,551 | 1/1978 | Stern | 210/475 |
| 4,261,738 | 4/1981 | Valentine | 75/744 |
| 4,326,952 | 4/1982 | Blake | 210/243 |
| 4,517,082 | 5/1985 | Prudhomme | 210/DIG. 8 |
| 4,612,093 | 9/1986 | Shor | 75/741 |
| 4,676,900 | 6/1987 | Masihy | 210/307 |
| 4,701,259 | 10/1987 | Rosaen | |
| 4,816,148 | 3/1989 | Hemman | 210/475 |
| 4,838,907 | 6/1989 | Perry | |
| 4,959,144 | 9/1990 | Bernard | 210/DIG. 8 |
| 5,006,264 | 4/1991 | Acuna | 210/192 |
| 5,034,123 | 7/1991 | Tanaka | 210/416.1 |
| 5,035,811 | 7/1991 | Grondin | 210/416.1 |
| 5,100,540 | 3/1992 | Ramirez | 210/416.1 |

FOREIGN PATENT DOCUMENTS 1224017 9/1989 Japan .................. 210/335

Primary Examiner—Thomas M. Lithgow
Attorney, Agent, or Firm—Schweitzer Cornman & Gross

[57] ABSTRACT

A recovery system for precious metal particles in wash solutions includes a pair of filter elements and a pump mounted within a closed tank. The first filter is of relatively large pore size, and traps layer particles. The prefiltered liquid is collected within the tank. A pump is mounted within the tank, and drives the collected liquid and remaining particles through the second filter, which is of a small pore size chosen to trap the remaining particles. After passage through the second filter the wash water may be discarded.

3 Claims, 1 Drawing Sheet

PRECIOUS METAL RECOVERY SYSTEM

The present invention relates to a new and improved apparatus for the recovery of precious metal particles, such as gold, from jewelers' wash solutions and the like in which the particles of the precious metals are suspended.

BACKGROUND OF THE INVENTION

During refining, treatment and manufacturing processes, jewelers and others in the precious metal trade utilize a variety of solutions to clean, wash or otherwise treat the products. These solutions carry precious metal particles, either as a result of abrasion or other mechanical removal from a precious metal item, or as a result of chemical processes which precipitate the precious metal out from the treatment solution. It is well known to filter or otherwise subject such solutions to mechanical means to recover the precious metal therefrom. Such systems may typically include settling tanks, in which the solution carrying the particles is allowed to sit undisturbed wherein the particles settle to the bottom for collection; filter chambers with string wound filter tubes, and nylon mesh filter traps. Despite their common usage, such systems are subject to several deficiencies. The use of settling tanks, for example, requires a relatively long undisturbed residence time for the solution to permit the settling process to be effective. Such an apparatus is difficult to utilize and is inefficient in a system where wash solutions are constantly being generated. In addition, because of the long time required for complete settling, the liquid often stagnates, generating unpleasant, if not dangerous, odors.

Typical filtering systems utilizing string wound filters provide for relatively efficient filtering when new, but quickly become clogged with particles. Removal of the particles from the filter media is difficult, typically requiring the burning of the media. Obviously, this prevents reuse.

It is accordingly the purpose of the present invention to provide a novel recovery system for precious metal particulates which provides increased efficiency over the prior art and accomplishes such efficiency in an economical and convenient manner.

BRIEF DESCRIPTION OF THE INVENTION

The present invention is a dual-stage filter system in which a relatively coarse mesh, prefilter is utilized in conjunction with a pump-driven, fine mesh, main filter. The prefilter is arranged to treat the particle-containing wash liquid prior to its passage through the filter pump unit. This improves the performance of the pump and extends its life. The wash liquid is then directed through the main filter. Because the liquid passing through the main filter has had larger size particles removed by the prefilter, the main filter has an extended life over single stage units. The drive pump for the main filter is located within a liquid-retention tank in which the prefiltered liquid collects. The pump is preferably at the bottom of the tank to provide complete withdrawal of the liquid from the chamber through the main filter. With a properly-sized tank, a pump of relatively small capacity may be used, further contributing to operating efficiencies of the invention.

BRIEF DESCRIPTION OF THE DRAWINGS

A fuller understanding of the present invention will be accomplished by reference to the following detailed description of the invention in conjunction with the annexed drawings, wherein.

Figure 1:
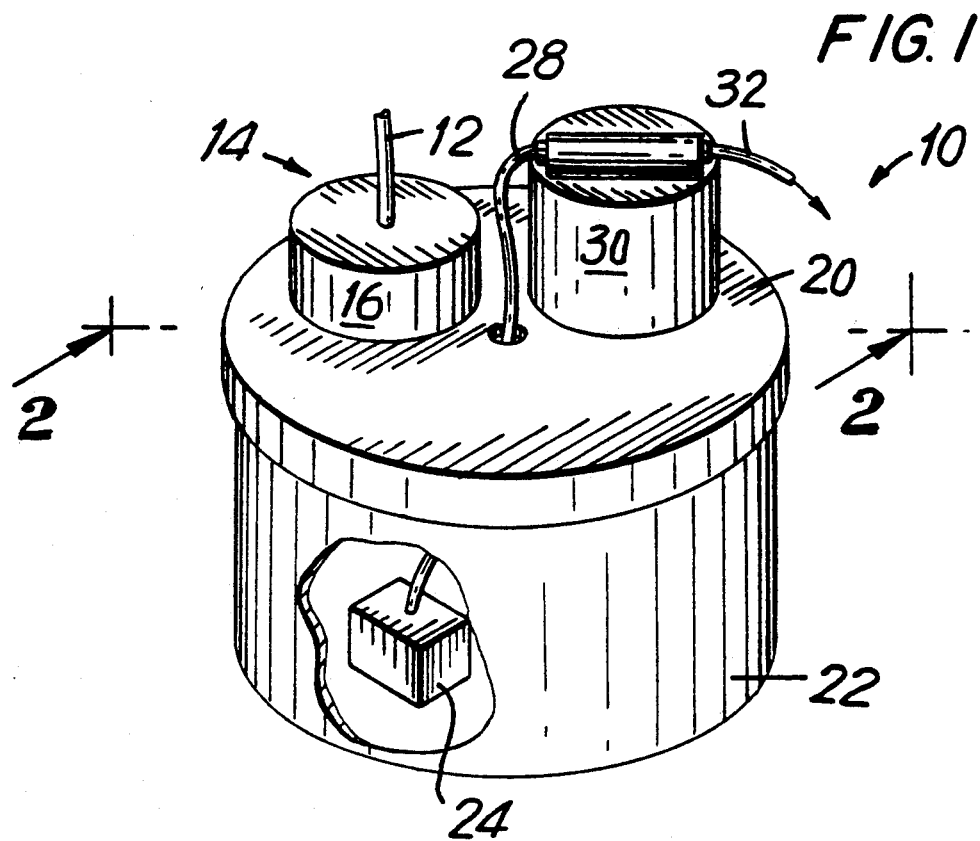
FIG. 1 is a perspective view of a filter system embodying the present invention.
Figure 2:
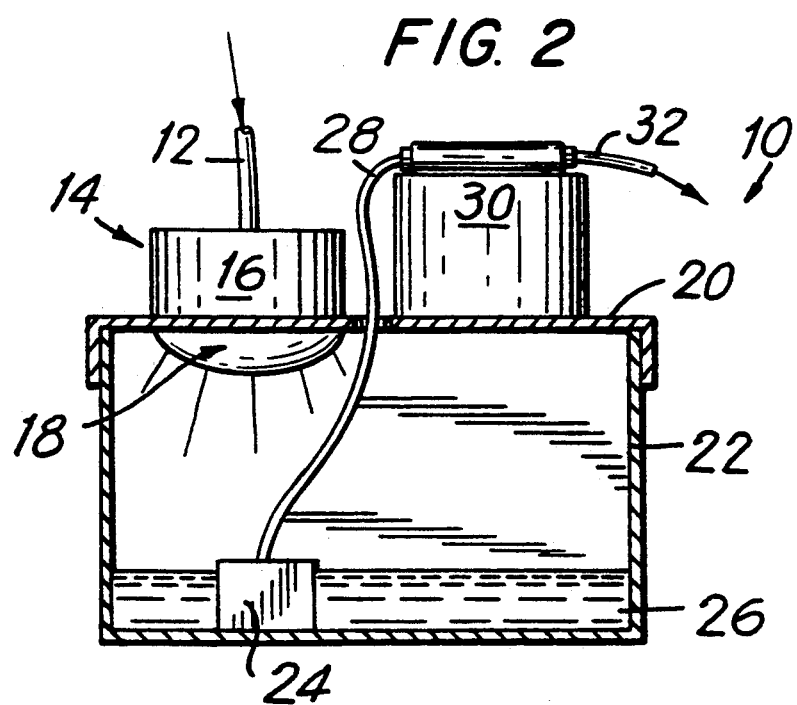
FIG. 2 is an elevation view taken in section along line 2—2 of FIG. 1.

Referring to the Figures, the filtering unit 10 embodying the present invention comprises an inlet hose 12 in which the particulate-bearing wash or other liquid sought to be treated is transported to the unit. Typically, such wash liquid may be gravity fed, although an appropriate pump means (not shown) may be provided if necessary. The inlet hose 12 leads to prefilter assembly 14, which may include a filter inlet manifold 16 across which the prefilter media 18 is affixed. The manifold 16 is of increased cross-section area to provide a large working filter surface for the filter media 18. The filter media 18 is of cloth mesh, having a pore size in the 100 micron range. Such a pore size provides significant prefiltering of larger size particulate matter. In addition to filtering of the larger size precious metal particles, the prefilter serves as a trap for other materials, such as stones, which fall into the wash water.

The filter inlet manifold 16 and prefilter 18 are preferably mounted on tank cover 20, which is in a friction-fit relationship with the upper edge of collection tank 22, into which the wash liquid falls after prefiltration. While dependent on the flow rate, the tank may be of approximately 3.5 gallon size. The prefilter assembly 14 may be adapted and designed to have a press fit within an appropriately sized aperture in the tank cover.

Main filter drive pump unit 24 is located on the bottom of the tank 22. The pump may include an integral float switch (not shown) which activates the pump when the level of the wash liquid 26 within the tank reaches a certain level. The pump 24 drives the collected liquid through outlet hose 28 into main filter assembly 30 which may be of known construction, having a 20 micron pore size cotton-wound filter cartridge. After the main filtering, the fully filtered liquid exits through pipe 32 to be drained as required.

Because the prefilter assembly 14 treats the wash water before it is collected in the tank 22 and passes through pump 24, the pump may be located directly on the floor of the tank without deleterious effects to its operation. Without the prefilter, significant clogging of the pump can occur, typically requiring the pump to be suspended substantially above the tank bottom. This both maintains an undesired level of liquid within the tank at all times, permitting the water to stagnate and develop off odors and, as the headroom above the pump is limited, can require a pump of larger capacity than otherwise needed to avoid tank overflow during high wash activity periods.

With the filter elements in place, the waste water to be treated is allowed to pass through the prefilter and collect in the tank. As the level of the water rises in the tank, the pump is activated, driving collected liquid through the pump exit and through the main filter. The fully-filtered liquid may then be drained and disposed of as required. In typical operation, it has been found that the prefilter should be changed or cleaned approximately once a week. Typically, this is accomplished by replacement of the prefilter media and recovery of the gold from the removed element. Essentially complete removal of the precious metal particulate matter is achieved with minimal down time and with a minimum of cost coupled with maximum efficiency.

I claim:

1. Apparatus for the recovery of precious metal particulates suspended in liquid wash solutions, comprising a tank having a first filter of relatively coarse mesh located within said tank at the top thereof, said tank positioned to collect the liquid outflow from said first filter ; pump means mounted within said tank for removing the liquid from said tank; a second filter of relatively fine mesh with respect to the first filter, coupled to the output of said pump means for further filtering the liquid; said tank comprising a main body and a snap-on lid with said first and second filters being mounted to said lid and switch means coupled to said pump means responsive to the height of the liquid in said tank to energize said pump to maintain the level of the liquid within said tank below the top thereof.

2. The apparatus of claim 1, wherein said pump is mounted to the bottom of said tank.

3. The apparatus of claim 2, wherein said first filter is of approximately 100 micron mesh and said second filter is of approximately 20 micron mesh.

* * * * *